Figure 1:
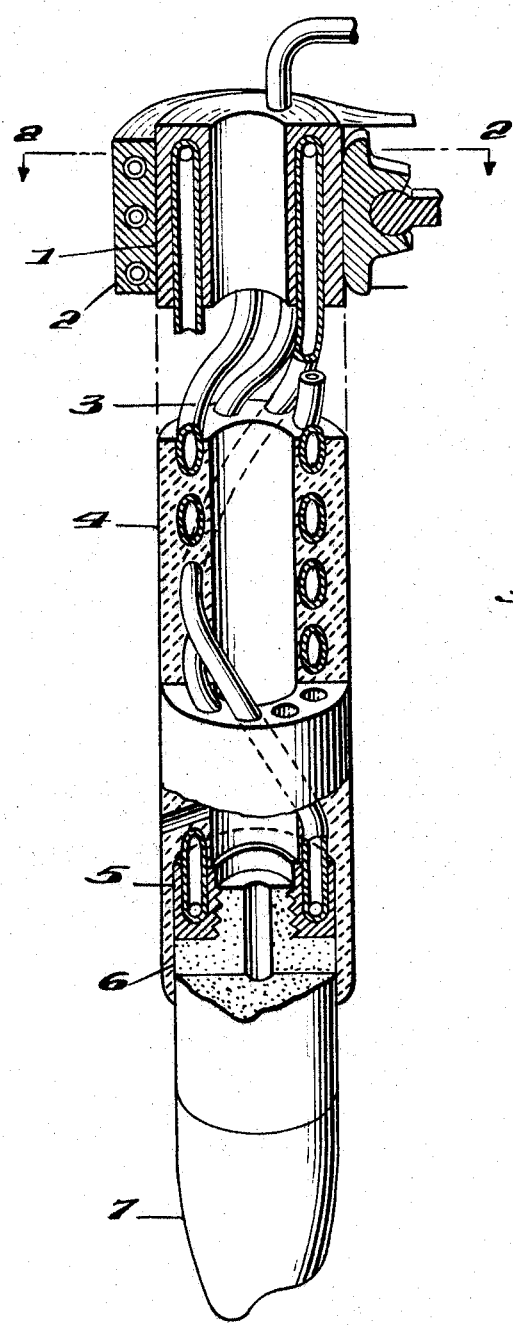

July 9, 1968

JAN-ERIK OSTBERG 3,392,227

ELECTRODE FOR ARC FURNACES

Filed July 13, 1966

INVENTOR.
JAN-ERIK OSTBERG,
BY
Bailey, Stephens & Huettig
ATTORNEYS

United States Patent Office 3,392,227
Patented July 9, 1968

3,392,227
ELECTRODE FOR ARC FURNACES
Jan-Erik Ostberg, Torps Sateri, Bettna, Sweden
Filed July 13, 1966, Ser. No. 564,972
Claims priority, application Sweden, July 13, 1965,
9,220/65
7 Claims. (Cl. 13—15)

The invention relates to an electrode for electric arc furnaces.

Except in those cases in which the material of an electrode is intentionally consumed as part of the process, the part of the electric current conducting circuit which is next to the electric arc in electric arc furnaces is usually manufatured of some carbonaceous material. This part, which is exchangeable because it is consumed during the operation, is the electrode proper. Originally graphite and amorphous carbon were used for this purpose, but specially fabricated graphite has given the best performance and by virtue of continuous improvements in its manufacture it has obtained an ever increasing perfection of the qualities which are of significance for its various purposes. This high degree of perfection of the fabricated electrode graphite has drawn the attention from the fact that electrode graphite and generally carbonaceous material in addition have properties which are the causes of expense and also of difficulties in the operation of the furnaces. The object of the present invention is to overcome these shortcomings.

The electrodes cause expense because they are consumed and have to be replaced. The main reason for the consumption is, normally, that the carbon material from which the electrodes are made is oxidized by the furnace atmosphere. In the case of amorphous carbon an appreciable oxidation occurs already at relatively low temperatures. In the case of graphite it slowly starts at a temperature around 500° C. and oxidation rate increases rapidly with increase of temperature. Numerous efforts have been made to control this electrode consumption. One way is to arrange cooling means in order to bring the greatest possible proportion of the electrodes to a temperature below the critical range. Another is to control the flow and the composition of the furnace gases in order to minimize the chemical interaction between the electrodes and the furnace gases. The danger of interaction with the furnace gases is particularly great in such electric steel furnaces where the carbon-oxygen-reaction is carried out in such a way that the reaction product CO is oxidized to $CO_2$. In itself this is a very favorable reaction but to avoid extremely high costs it is definitely required that steps are taken so that the electrodes are protected from the very reactive gas. As long as the electrodes are manufactured of carbonaceous material, this is only possible with certain technical measures.

All of the steps which may be taken in order to bring the consumption of carbon or graphite electrodes to a minimum have some effect but normally none of them is able to prevent the originally uniform diameter of the electrode from gradually changing to the shape of a truncated cone with the smaller diameter at the end where the arc is struck. At the foot of the arc the electrode diameter may be only 20% to 40% of the original dimension. This cone-form of the electrode adds to the difficulties of avoiding leakage around the electrode, when it enters through holes into the furnace chamber.

The foot of the electric arc is just a small fraction in area of the cross section of the electrode. Because of this, the reduction in area in the neighborhood of the arc foot has the advantage that it reduces the area upon which the arc may wander around unsteadily. The current is concentrated, and the necessary high temperature at the arc foot is more easily maintained. Because of all this the electric arc functions better. Although this tendency makes for improvements in the performance, there is no guarantee that an ideal situation is obtained and there is no control. Contrary to this, all the steps that may be taken in order to minimize electrode consumption through breakage or oxidation result in a minimizing of the tendency of the electrode to get conical. Generally speaking a normal electrode does not lend itself to control of the electric arc and particularly not when the efforts to bring the consumption under control are successful. The need of bringing the electric arc under control and developing it in a smooth and regular way is increasing in association with the increasing efforts for better furnace performance and for automation. In addition to the facts which are already mentioned, a number comes into the picture. Of particular interest in the possibility of influencing the development of the electric arc by introducing gases into it. Except for experiments, this means has been little used because the manufacture of electrodes with a central hole, which is a logical arrangement when introducing such gases is very difficult and costly.

The fundamental idea of the present invention is to accept the fact that a number of partly contradictory functions are given to the furnace electrode and to appreciate the fact that no single circuit element is able to cope with all of them. The present invention is consequently characterized in that the electrode is built up of a number of different parts, each of which is particularly adapted to deal with one or a few of the functions which are required by the electrode. The principal function of carrying the electric current is performed by a metallic structure, whereby in addition to the accompanying high electric conductivity the mechanical stresses are absorbed by a small-sized structure. This structure is designed to control both the direct and the alternating current losses. This element is cooled in order not only to give itself protection but also in order to create a certain possibility of influencing the temperature of the electrode head. The electrode head proper can not be made of metal except in cases where the intention is that the electrode material shall take part in the process in question. The electrode head may thus be manufactured from any known material and the head is attached to the previously mentioned metallic element by screw-connection, by connection by means of shrinking or by any other suitable method of connection. This head may be formed by two or more individual pieces attached to each other. The length this head is to be chosen is a compromise between two opposing considerations. On the one hand it must not be too long to facilitate the regulation of the temperature by means of the cooling of the metallic part. On the other hand, it is not practical to add lengthening pieces too frequently.

Although the idea has not been accepted, it is known that proposals have been made from time to time to use furnace electrodes consisting of one carbon or graphite piece attached to another water-cooled metallic piece. To the extent to which real trials have been made, they have been failures. One novel feature which makes the present invention work is that the metallic element is completely or for its major part bedded in a ceramic material. This material has to be chosen to meet high requirements of temperature shock and high resistance towards vibration and wear. In addition to this the conductivity of the material for electricity and heat must exceed certain levels.

Within the framework of these principles some variation is possible. However the following shows an example of how it may be carried out successfully in practice:

The metallic element in this case has one head piece in each end and the two are connected by a number of individual tubes. The one of the two heads, which is located farthest from the electric arc is so designed that it may be attached to the electrode holder of the electrode carrying structure, which the furnace may have. This holder is equipped with suitable connections for the electric current and for the cooling medium. For this purpose, the two separate chambers for the cooling medium, one distributing the medium to the tubes which carry this medium to the second head and one chamber collecting the returning medium from the rest of the tubes.

The second head is also designed as a chamber and in this chamber the incoming coolant is collected and directed towards the outgoing tubes. The head has arrangements for example like nipples or nobs conforming with the type of attachment which has been chosen in order to connect the head with the electrode head. The wall thickness of this head is an important consideration, where mechanical strength and cooling efficiency must both be taken into account.

The number of the tubes which connect the two heads with each other has to be as great as possible. The tubes are arranged in one or more circles leaving an open space in the cross-section free of tubes, which is an important thing as well from the point of electrical efficiency as well as for the purpose of giving the possibility of taking various actions from inside the electrode. At least some small distance must be allowed for between the individual tubes allowing for insulation. Each tube winds spirally on its way from one head to the other, thereby making about one turn or more, which is a means to get a uniform distribution of the electric current.

The choice of material for these metallic elements is in itself not an object of this invention. However, the general arrangement opens a possibility to keep the choice of material broad. Normally high conductivity copper will be the choice, because this will help to keep the weight and the dimensions down. In special cases other materials may be called for.

The ceramic protective material covers the whole metallic part and the electrode head. A most important result of the present invention is that the electrode is much lighter and smaller than normal electrodes for the same loads. All parts contribute to this effect. For this reason a material with comparatively low specific weight is preferred for the ceramic protective layer. The thickness of the layer outside the metallic tubes is also kept to a minimum, which means something between 10 and 120 mm. A ceramic material also fills the space between the tubes for insulation and the space inside the inner circle of the tubes. In the very center a space is left free, which may be used for introduction of materials for the process or particularly gases for the regulation of the electric arc. This open space may in cases be divided into more than one chamber. In cases where the gases from the process in the furnace act upon the ceramic material of the protective layer, holes may be made from this central hole to the outside of the electrode permitting a control of the atmosphere around the electrode to be maintained. As particularly useful for the protective layers may be mentioned such materials which are produced from glasses through crystallization. Useful are also materials with a sillimanite base, high-alumina materials and spinels. Preferred materials are of low thermal expansion and as uniform expansion as possible. Low porosity is also of importance.

The electrode head is best made of graphite because of its excellent mechanical properties and excellent electric conductivity but other carbonaceous materials are useable. A most practical way of attaching the electrode head to the head of the metallic element is a combination of screw-connection and shrinkage-connection individual graphite pieces being shrunk upon each other and on a metallic ring, which in turn is screwed on the metallic element. Often the electrode head consists of a hollow electrode permitting the introduction of materials for the process or gases for the control of the electric arc. Even some control of the atmosphere around the tip of the electrode head is useful and such gases as carbon-hydrogen compounds may be used.

Because of the effects of this design upon mechanical strength as well as electric conductivity, it is possible to make the electrode head of a much smaller diameter than a normal electrode for the same load and the length is also a fraction of the normal graphite electrode. As a maximum the length of the electrode head is 60% of the distance between the bottom of the furnace and the head of the side-walls and normally much shorter.

One of the advantages of the present invention is that it makes it possible to choose the cross-section of the electrode according to the considerations that might be most important in the particular practical case and it may be square or rectangular.

Figure 2:
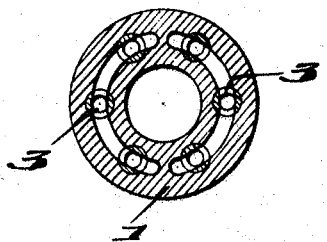

Within the framework of these principles variation is possible. The attached drawing showing in FIG. 1 an electrode partly in section and in FIG. 2 a horizontal cross-section explains how the invention may be successfully carried out practically:

The metallic element, which is connected to an electrode holder 2 of any known design, is composed of three major parts: the upper head 1, the lower head 5 and a number of tubes 3 connecting these two heads. The upper head is divided into two chambers 1a and 1b, the walls between the two chambers being vertical. On top of the head tubes 1c and 1d are shown, which supply and withdraw cooling medium and electric current.

The lower head has just one chamber in the case shown, although particular means may be called for in order to guide the flow of the cooling medium. The design of this head is adjusted to suit the particular means of fixing the electrode head proper. In this case screw threads are shown but other means serve well. The wall thickness of this chamber has an influence upon the cooling efficiency as well as on the mechanical strength and is for that reason an important consideration.

The tubes which connect the two heads carry electric current and cooling medium from the upper head to the lower one and vice versa. Of course the tubes which are connected with the inlet chamber of the upper head carry water to the system whereas the tubes which are connected to the other and outgoing chamber of the same head receiving the cooling medium returning after the circulation through the metallic element. The tubes are arranged annularly with a small distance between the tubes to allow for insulation. The arrangements of the tubes is such that the current distribution meets the requirements of each particular case. In the figure is shown one way of doing this. Here each tube winds spirally on its way from one head to the other, thus ensuring a uniform distribution between the individual tubes. In cases where a non-uniform distribution is desired, a straight arrangement is preferred and in this case one or more of the tubes may be isolated entirely from the system.

The ceramic protective material 4 covers the whole metallic part, except the upper head, which forms the electrode holder. Most often it is preferable to have the ceramic material protrude somewhat below the lower head as is shown in the drawings in order to protect the joint between the lower head and the electrode head proper. The spaces between the individual tubes are filled with ceramic material, thus insulating them electrically from each other. The drawings show the normal case where the metallic part is designed to give a free open throughway in the middle because the heads are given annular cross-sections and the tube-system is arranged in a ring. The ceramic material in this case is restricted to the amount necessary to give the insulation between the tubes and the protection on the outside where thermal losses are the critical factor. In the middle however an opening is left. In any case this is a factor contributing to lower weight.

In many cases this open space in the middle is a most valuable asset to the whole design in a number of other respects. One is that it offers an easy means to introduce gases, either to the tip of the electrode if the electrode head is also made hollow or through holes leading to the outside of the electrode proper if a protective gas layer or a reaction gas supply is called for. The protection of the electrode tip by means of a neutral gas film adds to the economy of the operation. The space in the middle may be divided in sections in case more than one type of material is to be added without interference with the other. The addition may of course be fluid or solid.

Even if none of these usages of the open space in the middle of the electrode is made use of, it gives the advantage of diminishing the weight of the whole structure. It is possible to reduce the diameter of the structure appreciably because of the great current carrying capacity of the metallic part. The length of the electrode may also be less than that of a normal electrode. A much desired reduction in weight of the electrode is thus possible in spite of the fact that the specific weight of some of the components are greater than that of, for instance, graphite.

I claim:

1. An electrode for electric arc furnaces comprising an upper head, a lower head of conductive material, a conductive metal structure connecting said heads, an electrode head carried by said lower head, and a ceramic covering enclosing said metallic structure.

2. In an electrode as claimed in claim 1, said metallic structure including conducting means for a cooling medium.

3. In an electrode as claimed in claim 1, said upper and lower heads being hollow and said metallic structure comprising tubes connecting said upper and lower heads.

4. In an electrode as claimed in claim 3, said tubes extending spirally around the longitudinal axis of the electrode.

5. In an electrode as claimed in claim 1, said upper head, metallic structure and ceramic covering having a central longitudinal hole therein.

6. In an electrode as claimed in claim 5, said electrode head having a hole therein communicating with said longitudinal hole.

7. In an electrode as claimed in claim 1, said ceramic covering partly overlapping the electrode head.

References Cited

UNITED STATES PATENTS

| | | | |
|---|---|---|---|
| 2,052,796 | 9/1936 | Rava | 219—75 |
| 2,871,533 | 2/1959 | Swainson | 164—52 |

BERNARD A. GILHEANY, *Primary Examiner.*

H. B. GILSON, *Assistant Examiner.*